United States Patent [19]
Zimmermann et al.

[11] 3,777,453
[45] Dec. 11, 1973

[54] INTERMEDIATE CONVEYOR SYSTEM FOR USE WITH BAGGING AND CARTONING MACHINES

[75] Inventors: Helmuth Zimmermann, Waiblingen/Wurttemberg; Helmut Kielwein, Stuttgart, both of Germany

[73] Assignee: Fr. Hesser Maschinenfabrik AG, Stuttgart, Germany

[22] Filed: Sept. 26, 1972

[21] Appl. No.: 292,311

[52] U.S. Cl............................ 53/251, 53/46, 198/25
[51] Int. Cl................................................. B65b 7/08
[58] Field of Search........................ 53/251; 198/25

[56] References Cited
UNITED STATES PATENTS
3,191,748  6/1965  Martin................................. 198/25
3,592,003  7/1971  Stichhan........................... 53/251 X

*Primary Examiner*—Travis S. McGehee
*Attorney*—Michael S. Striker

[57] ABSTRACT

An intermediate conveyor system which transports filled and closed bags from an intermittently operated conveyor of a bagging machine to a continuously operated conveyor of a cartoning machine. The conveyor of the bagging machine delivers two rows of bags which are located in two vertical planes, and the conveyor of the cartoning machine has a single row of horizontal trough-shaped receptacles. The intermediate conveyor system has a removing unit with two turntables each carrying two pivotable arms having suction heads. The arms of one turntable remove bags from one of the rows and the arms of the other turntable remove bags from the other row. Each freshly removed bag is turned through 180° and is deposited into one of a series of continuously driven containers for transport into a receptacle of the conveyor in the cartoning machine. A rear wall of the each container is movable between an upright position in which it receives a bag and a horizontal position in which it deposits a bag into an empty receptacle. The containers carry and cooperate with tools serving to reduce the dimensions of bags not later than on transfer of bags into the receptacles.

23 Claims, 8 Drawing Figures

INTERMEDIATE CONVEYOR SYSTEM FOR USE WITH BAGGING AND CARTONING MACHINES

CROSS-REFERENCE TO RELATED APPLICATION

The intermediate conveyor system of the present invention can be used for transport and conditioning of bags which are turned out by machines of the type disclosed in the commonly owned copending application Ser. No. 96,066 filed Dec. 12, 1970 by Paul Kühnle et al.

BACKGROUND OF THE INVENTION

The present invention relates to machines for making, filling and closing bags and for depositing the thus produced bags in cartons or boxes. More particularly, the invention relates to improvements in production lines of the type wherein bags are produced, filled, closed, otherwise treated and introduced into cartons or the like in a continuous mass-producing operation. Still more particularly, the invention relates to improvements in intermediate or connecting conveyor systems which are used to transport bags from a bag making, filling and closing machine to a cartoning or an analogous packaging machine.

The commonly owned copending application Ser. No. 96,066 discloses a bag making and manipulating machine which forms two parallel rows of closed bags ready for introduction into a cartoning or like packaging machine. A suitable cartoning machine which can receive and process the output of the bag forming and manipulating machine (hereinafter called bagging machine for short) is disclosed in U.S. Pat. No. 3,333,396 to Paal et al. As a rule, the cartoning machine is designed to transport a single row of cartons or boxes each of which is to receive a single bag or a stack consisting of an array of two or more discrete bags. The purpose of the intermediate conveyor system in a production line including a bagging and a cartoning machine is to transport bags from the bagging machine and to deliver the bags to the cartoning machine for introduction into prefabricated cartons. If each carton is to receive a single bag but the bagging machine discharges several rows of bags, the intermediate conveyor system must be provided with means for converting several rows of bags into a single row or file wherein the bags are ready for introduction into the cartoning machine. Problems arise when the bags which are discharged by the bagging machine must undergo additional treatment or conditioning prior to entering the cartoning machine. Such conditioning may involve changing the size and/or shape of bags, changing the distribution of the contents of bags, applying labels, printed matter or other indicia to the bags, changing the orientation of bags, stacking the bags, and/or other treatments.

Furthermore, the intermediate conveyor system must be assembled in a small area, its parts should be readily accessible for inspection or repair and/or for removal of defective or damaged bags, and its operation should be automatic to achieve savings in personnel. Still further, the intermediate conveyor system should be capable of conditioning and/or transporting differently dimensioned and/or configurated bags toward differently dimensioned and/or configurated cartons or the like.

SUMMARY OF THE INVENTION

An object of the invention is to provide an intermediate conveyor system which can transport bags or analogous commodities between the intermittently driven conveyor of a bagging machine and the continuously driven conveyor of a cartoning or another packaging machine.

Another object of the invention is to provide an intermediate conveyor system which can convert two rows of freshly formed, filled and closed bags into a single file or row for delivery of a single series of closed bags to the cartoning machine.

A further object of the invention is to provide an intermediate conveyor system which embodies (and/or cooperates with) means for subjecting the bags to one or more treatments, particularly for effecting desirable changes in the shape and/or size of bags, during transport to a cartoning or other packaging machine.

An additional object of the invention is to provide a production line which embodies the improved intermediate conveyor system and wherein the conveyor system occupies little room and is capable of operating in a fully automatic way with attendant savings in personnel and higher output of the production line.

Still another object of the invention is to provide the intermediate conveyor system with novel and improved bag receiving, transporting and conditioning units.

The invention resides in the provision of a production line which comprises a first conveyor preferably forming part of an automatic bagging machine and arranged to transport at least one row (but preferably several rows) of filled and closed bags or analogous commodities along at least one first path in which the commodities are preferably located in a vertical plane, a second conveyor which may form part of an automatic cartoning or other packaging machine and is spaced apart from the first conveyor and includes a series of preferably horizontal trough-shaped receptacles each of which is arranged to receive at least one commodity, and a novel intermediate conveyor system which is disposed between the first and second conveyors.

The intermediate conveyor system comprises a receiving unit including one or more suction heads, tongs or analogous retaining means serving to accept commodities from the first conveyor and transmission means for changing the orientation of loaded retaining means (for example, the transmission means may be arranged to turn the retaining means through first 180° while the retaining means is loaded and to turn the retaining means through another 180° while the retaining means is empty). The intermediate conveyor system further comprises a transporting unit having a plurality of containers which are arranged to travel along a further path extending from the receiving unit to the second conveyor. The containers accept commodities from loaded retaining means subsequent to a change in orientation of the retaining means and serve to transport the thus accepted commodities toward but preferably directly into the receptacles of the second conveyor.

The first path is preferably a straight path which is parallel to the path of movement of the containers in the transporting unit and to the path of movement of receptacles in the second conveyor.

The intermediate conveyor system may embody and/or cooperates with one or more conditioning means to subject the commodities to at least one treatment (preferably to change the size and/or shape of commodities) during transport in and/or during removal from the containers.

The novel features which are considered as characteristic of the invention are set forth in particular in the appended claims. The improved intermediate conveyor system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
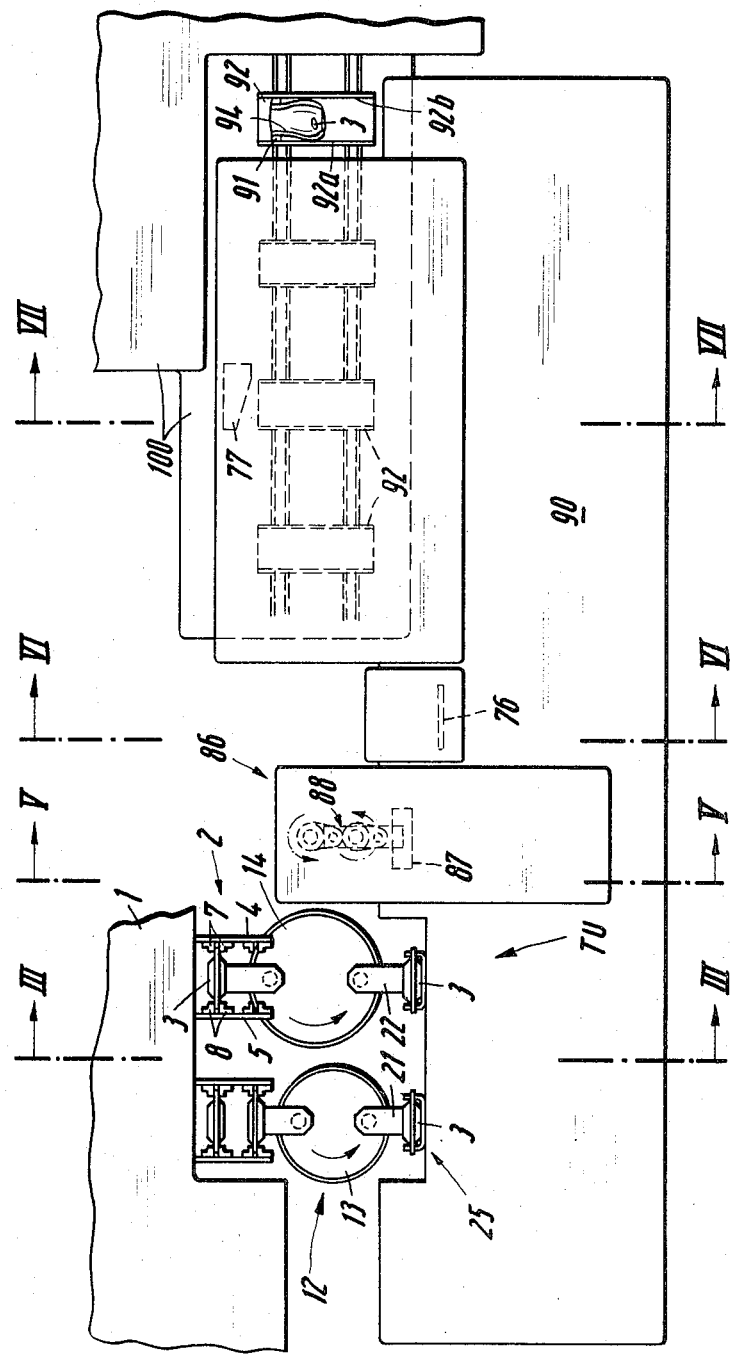
FIG. 1 is a fragmentary plan view of a production line including an intermediate conveyor system which connects a bagging machine with a cartoning machine and is constructed and assembled in accordance with the invention.
Figure 2:
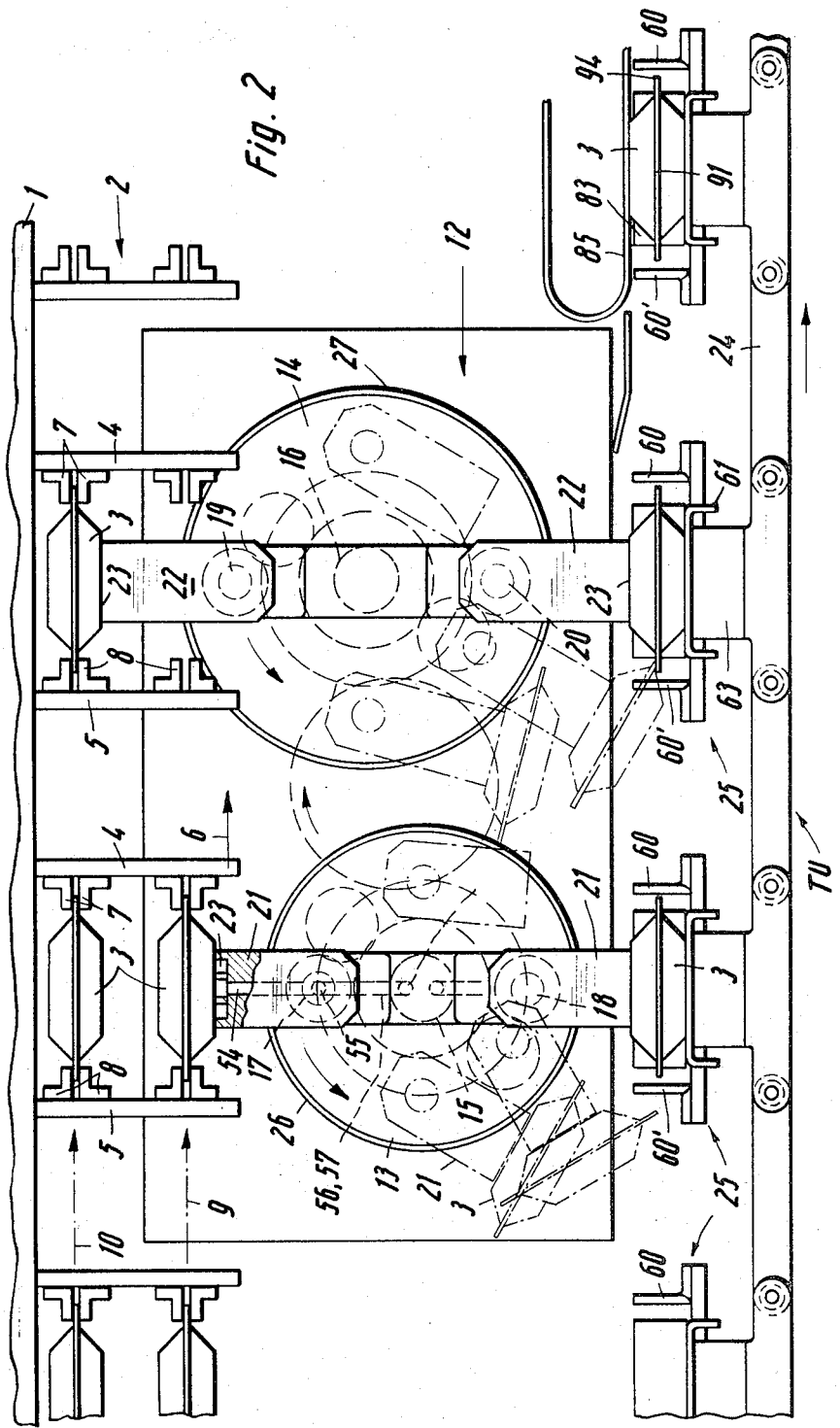
FIG. 2 is an enlarged view of the bag removing unit in the intermediate conveyor system of FIG. 1.
Figure 3:
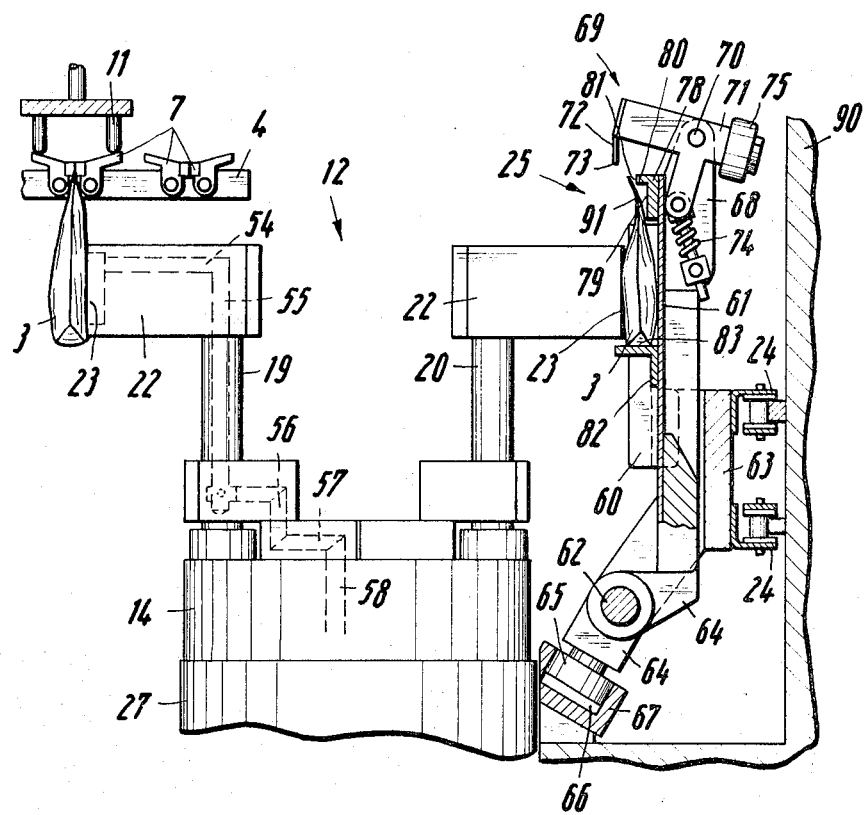
FIG. 3 is an enlarged transverse vertical sectional view as seen in the direction of arrows from the line III—III of FIG. 1.

Referring first to FIGS. 1 to 3, there is illustrated a portion of a production line which includes a first packaging machine 1 here shown as a bagging machine of the type disclosed in the commonly owned copending application Ser. No. 96,066 filed Dec. 12, 1970 by Kühnle et al., a second packaging machine 100 here shown as a cartoning machine similar to that disclosed in commonly owned U.S. Pat. No. 3,333,396 granted Aug. 1, 1967 to Paal et al., and a novel intermediate conveyor system which includes means for transporting bags 3 from the machine 1 to the machine 100 as well as means for conditioning the bags 3 during transport between the two machines.

The bagging machine 1 comprises a first conveyor 2 which transports stepwise two rows of filled and closed bags 3 in a direction from the left to the right, as viewed in FIG. 1. The conveyor 2 includes one or more endless link chains (not shown) provided with pairs of cooperating carriers or arms 4, 5 and being driven to move the arms 4, 5 in stepwise fashion in the direction indicated by arrow 6 shown in FIG. 2. Each arm 4 supports two bag clamping devices 7, and each arm 5 supports two bag clamping devices 8. Each clamping device 7 on an arm 4 faces a clamping device 8 on the associated arm 5 and cooperates therewith to engage and hold a filled and closed bag 3. The paths along which the two rows of bags 3 travel stepwise (arrow 6) when the bagging machine 1 is in operation are indicated in FIG. 2 by phantom lines 9 and 10. The bags 3 which travel along the paths 9 and 10 are disposed in two parallel vertical planes. FIG. 3 shows one of several opening devices 11 which can open the nearest clamping devices 7 or 8 to thus allow for removal of bags 3 from the conveyor 2 of the bagging machine 1. The opening devices 11 are preferably actuated while the conveyor 2 is at a standstill. The details of the clamping devices 7, 8 and opening devices 11 are disclosed in the copending application Ser. No. 96,066 to which reference may be had if necessary.

The intermediate conveyor system comprises a bag removing unit 12 which serves to accept filled and closed bags 3 from successive pairs of clamping devices 7, 8. The removing unit 12 comprises two turntables 13, 14 which are respectively rotatable about the axes of vertical shafts 15, 16. As shown in FIG. 2, the turntable 13 supports two vertical pivot members 17, 18 which are located diametrically opposite each other with reference to the shaft 15. The turntable 14 also supports two vertical pivot members numbered 19 and 20 which are located diametrically opposite each other with respect to the axis of the shaft 16. The pivot members 17, 18 and 19, 20 respectively carry retaining arms 21, 22 the free end portions of which constitute suction heads 23. AS shown in FIGS. 1 and 2, the turntables 13, 14 are mounted in the space between the right-hand end turn of the conveyor 2 in the bagging machine 1 and the left-hand end turn of a transporting unit TU comprising two parallel endless link chains 24. The chains 24 are trained over sprocket wheels (not shown) and are continuously driven by an electric motor or another suitable prime mover. The chains 24 of the transporting unit TU carry equidistant containers 25 which serve to accept bags 3 from the suction heads 23 of the retaining arms 21, 22 and to transport the bags toward the cartoning machine 100 whereby the bags advance along at least one conditioning station. The chains 24 are driven at such a speed that they advance four successive containers 25 past the bag removing station (unit 12) during each revolution of the turntable 13 or 14.

The distance between the axis of the shaft 15 and the axes of pivot members 17, 18, the length of each retaining arm 21, the length of each retaining arm 22, and the distance between the axis of the shaft 16 and the axes of pivot members 19, 20 are selected in such a way that the suction heads 23 of the arms 21 can accept successive bags 3 which are being transported along the path 9 and that the suction heads 23 of the arms 22 can accept successive bags 3 which are being transported along the path 10. Also, the suction heads 23 of the arms 21 can deliver bags 3 to successive evenly numbered containers 25, and the suction heads 23 of the arms 22 can deliver bags 3 to successive oddly numbered containers 25 on the continuously moving chains 24 of the transporting unit TU. FIG. 2 shows the arms 21 in positions in which they extend radially outwardly with respect to the shaft 15; one of the arms 21 is then in the process of accepting a bag 3 which has been transported along the path 9 while the other arm 21 is in the process of introducing a bag 3 into the adjacent container 25. Analogously, the upper arm 22 (as viewed in FIG. 2) is in the process of accepting a bag 3 from the path 10 and the lower arm 22 is in the process of leaving a bag in the adjacent container 25. It will be noted that the maximum distance between the suction heads 23 of the arms 22 is greater than that between the suction heads 23 of the arms 21 because the path along which the containers 25 travel is nearer to the path 9 than to the path 10. The length of an arm 21 or 22 equals the length of the other arm 21 or 22. Also, the length of each arm 21 preferably equals the distance between the axis of the shaft 15 and the axis of the pivot member 17 or 18. Analogously, the length of each arm 22 preferably equals the distance between the axis of the shaft 16 and the axis of the pivot member 19 or 20.

Figure 4:
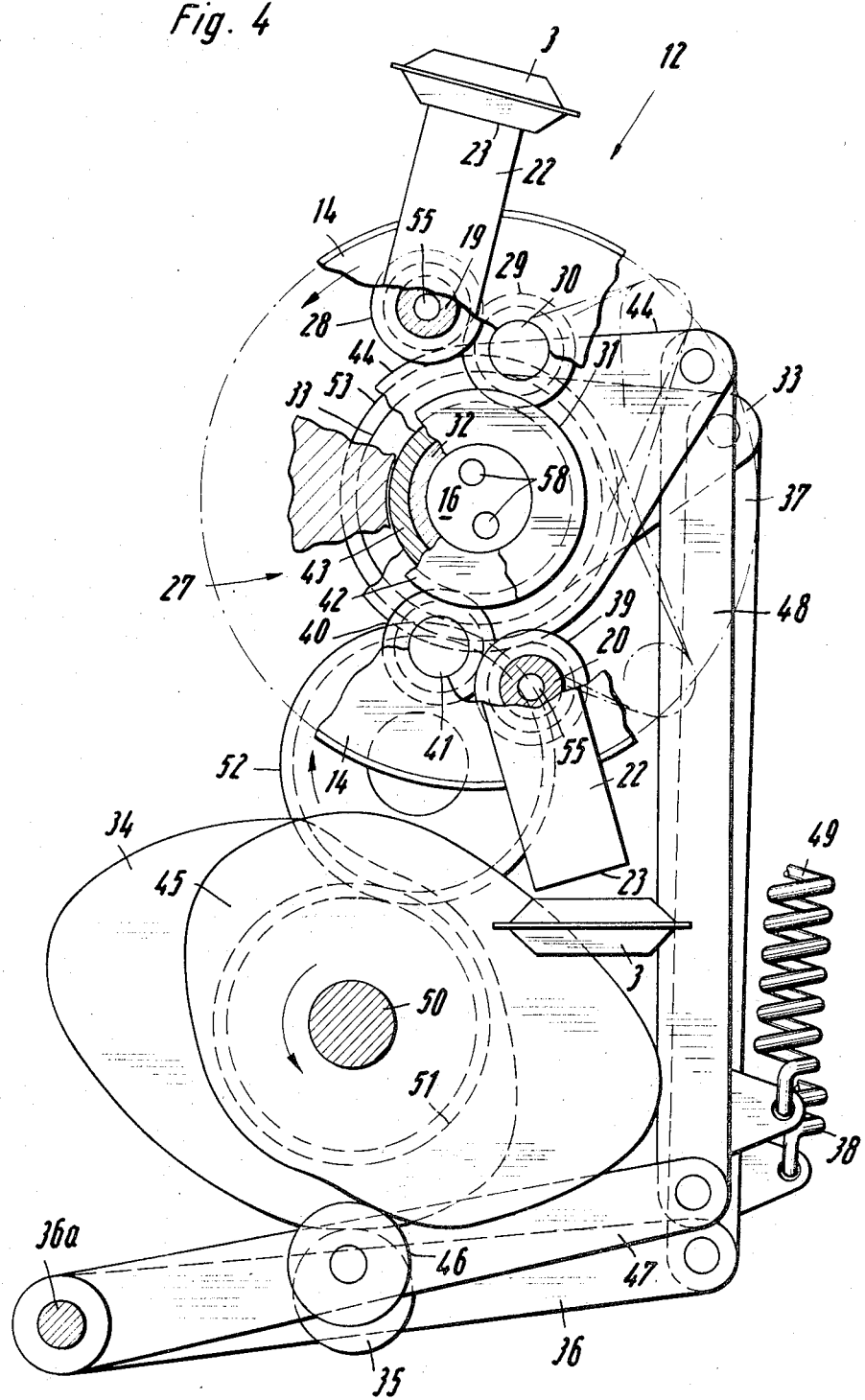
FIG. 4 is an enlarged partially plan and partially horizontal sectional view of a transmission in the bag removing unit of FIG. 2.

The turntables 13, 14 are respectively secured to and rotate with the shafts 15, 16 at a constant speed. During certain stages of each revolution of the shafts 15, 16, the arms 21 and 22 are respectively pivoted relative to the corresponding turntables 13, 14 by two transmissions 26, 27 the details of which are shown in FIGS. 2, 3 and 4. The purpose of the transmissions 26, 27 is to insure that the suction heads 23 approach the respective paths 9, 10 by moving substantially at right angles thereto as well as that the suction heads 23 (which carry bags 3) travel along arcuate paths during movement toward and away from the adjacent containers 25 of the transporting unit TU. Since the transmission 26 is preferably identical with or clearly analogous to the transmission 27, the drawing merely shows the details of the transmission 27 which, as stated above, serves to move the arms 22 relative to the larger turntable 14 while the turntable 14 rotates with the respective shaft 16 at a constant speed.

The transmission 27 comprises a spur gear 28 which is rigidly secured to the pivot member 19 on the turntable 14. The gear 28 meshes with a second spur gear 29 which is an intermediate gear and is free to rotate on a shaft 30 mounted on the turntable 14. The gear 29 meshes with a third spur gear 31. The number of teeth on the gear 31 is twice the number of teeth on the gear 28. The gear 31 is mounted on a hollow shaft 32 which is coaxial with the shaft 16 and is rigid with a lever 33. The latter can be pivoted by a suitably configurated cam 34 which is mounted on a camshaft 50. The motion transmitting connection between the cam 34 and the lever 33 includes a roller follower 35 which tracks the peripheral surface of the cam 34 and is rotatably mounted on a link 36. The latter is pivotable at 36a and is articulately connected with the lever 33 for the spur gear 31 by a further link 37. A helical spring 38 is provided to bias the roller follower 35 against the cam 34.

The transmission 27 further comprises a spur gear 39 which is rigid with the pivot member 20 on the turntable 14. The gear 39 meshes with an intermediate spur gear 40 which is free to rotate on a shaft 41 of the turntable 14. The gear 40 further meshes with a spur gear 42 having a number of teeth which is twice the number of teeth on the gear 39. The gear 42 is coaxial with the shaft 16 and is located at a level below the gear 31 and is secured to a hollow shaft 43 which is connected with a lever 44. The lever 44 can be pivoted by a second cam 45 which is also mounted on the camshaft 50. The motion transmitting connection between the cam 45 and lever 44 comprises a roller follower 46 mounted on a link 47, and a further link 48 which couples the lever 44 with the link 47. The latter is turnable on the pivot pin 36a. The roller follower 46 is biased against the peripheral surface of the cam 45 by a helical spring 49.

The camshaft 50 is rigid with a spur gear 51 forming part of a gear train which further includes an intermediate gear 52 and a third gear 53. The gear 53 is secured to the shaft 16. The number of teeth on the gear 51 equals that on the gear 53, i.e., the turntable 14 is driven in synchronism with the cams 34, 45 which serve to respectively pivot the levers 33, 44 and members 19, 20.

The configuration of peripheral surfaces on the cams 34, 45 (and the mounting of these cams on the camshaft 50) is such that the levers 33, 44 and gears 31, 42 are at a standstill when the suction heads 23 on the arms 22 are to accept bags 3 from the conveyor 2. At such times, the gears 29, 40 roll along the gears 31, 42 and pivot the arms 22 by way of the gears 28, 39 with reference to the continuously rotating turntable 14. Consequently, the suction heads 23 of the arms 22 advance along straight paths toward the adjacent bags 3 in the path 10 while the conveyor 2 is at a standstill so that the suction heads 23 are moved flush against the adjacent panels of the bags with the result that the bags are safely held during transfer into the containers 25. As soon as the suction head 23 on an arm 22 engages a bag 3, the direction of its movement is reversed (i.e., it moves at right angles to but away from the path 10), whereby each bag is caused to swing around through 180°.

The next-following portions of peripheral surfaces on the cams 34, and 45 are configured in such a way that the levers 33 and 44 (and hence the gears 31 and 42) are caused to turn so as to rapidly swing the arms 22 in a clockwise direction. During the next stage of rotation of the cams 34 and 45, the roller followers 35 and 46 are caused to move the levers 33, 44 and the gears 31, 42 in substantial synchronism with the turntable 14. The suction heads 23 of the arms 22 thereby travel along arcuate paths having their centers of curvature located on or close to the axis of the shaft 16. The path of the containers 25 is a straight path which is substantially tangential to such arcuate paths so that the suction heads 23 transfer the bags 3 into the approaching containers 25. The next-following portions of the peripheral surfaces on the cams 34, 45 thereupon cause the suction heads 23 of the arms 22 to be transferred into the aforementioned straight paths for movement at right angles to and toward the path 10. The transmission 27 changes the orientation of arms 22 in such a way that a loaded arm 22 turns through 180° during movement from the path 10 toward the path of the containers 25, and again through 180° during movement from the path of the containers 25 to the path 10.

The suction heads 23 have suction orifices or slots (see FIG. 2) which can be connected with a suitable suction generating device (not shown) by way of channels 54, 55, 56, 57, 58 machined into the pivot members 19, 20, turntable 14 and shaft 16 (see also FIG. 3). The connections between the orifices or slots of the suction heads 23 on the retaining arms 22 and the suction generating device are controlled by suitable valve means of known design so that the orifices are in communication with the suction generating device not later than when the corresponding suction head 23 contacts a bag 3 in the path 10 and that the orifices are thereupon sealed from the suction generating device when the respective head 23 delivers a bag into the approaching container 25. It is clear, however, that the suction heads 23 can be replaced by mechanical retaining elements, such as tongs, which serve to hold the bags 3 during transport from the path 10 into the containers 25. The manner in which the suction heads 23 are periodically connected with the suction generating device is similar to the manner of holding plain cigarettes and/or filter rod sections in peripheral flutes of drums in filter cigarette making machines.

The mode of operation of the parts which are mounted on the turntable 13 and of the transmission 26 is analogous to that of the just described parts on the turntable 14 and the transmission 27.

Figure 5:
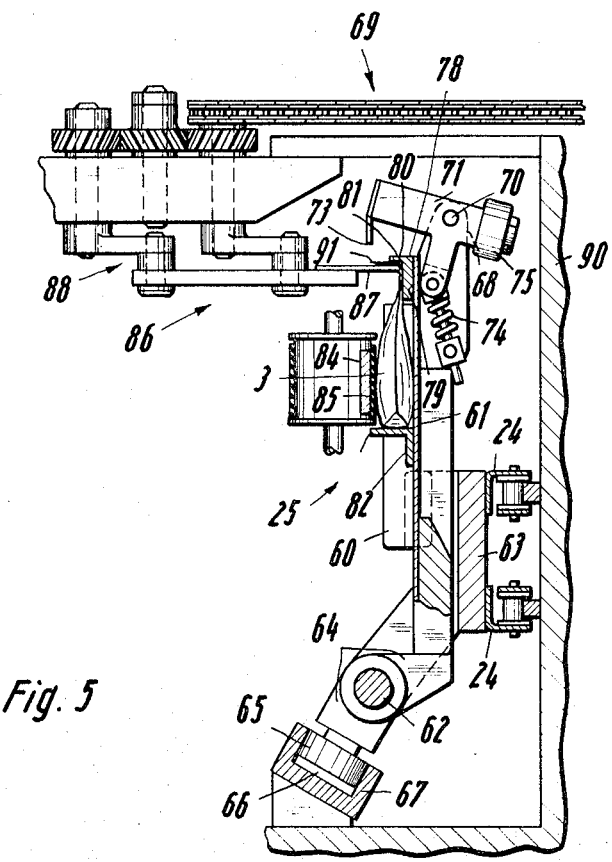
FIG. 5 is an enlarged transverse vertical sectional view as seen in the direction of arrows from the line V-V of FIG. 1.
Figure 6:
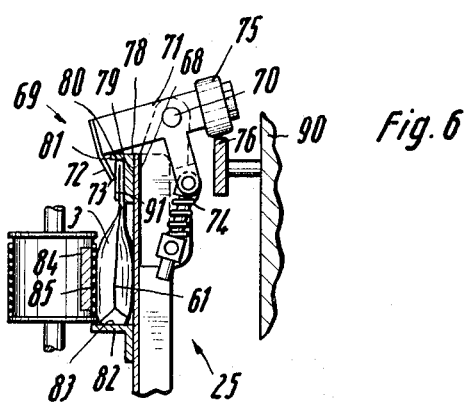
FIG. 6 is an enlarged transverse vertical sectional view as seen in the direction of arrows from the line VI—VI of FIG. 1.
Figure 7:
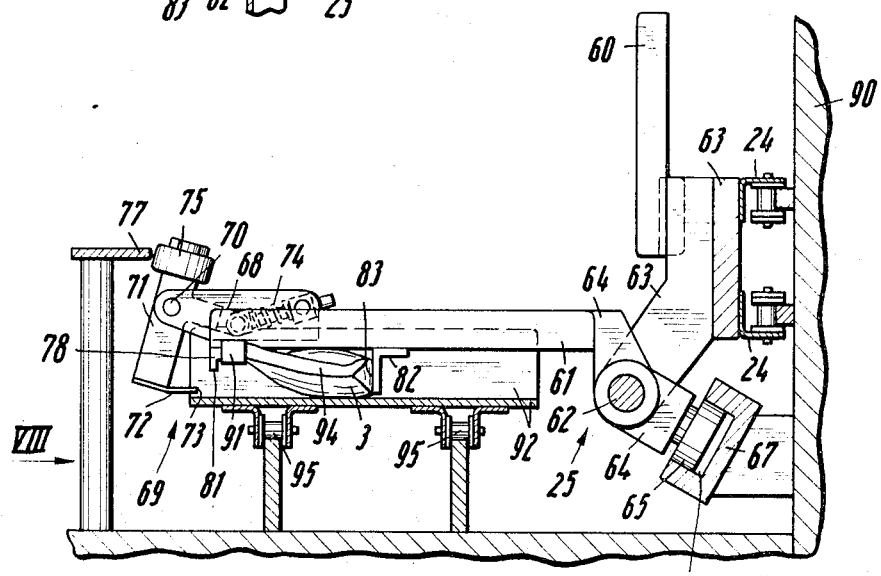
FIG. 7 is an enlarged transverse vertical sectional view as seen in the direction of arrows from the line VII—VII of FIG. 1.

The details of the containers 25 are illustrated in FIGS. 2, 3 and 5 to 8. Each container 25 comprises a pair of parallel vertical side walls 60, 60' (FIG. 2) which are located in planes making a right angle with the direction of travel of link chains 24 along the station which accommodates the turntables 13 and 14. The side walls 60, 60' extend forwardly from a movable container portion here shown as a rear wall 61 which is normally located in a vertical plane and then assumes a position in which it is normal to the planes of the side walls 60 and 60'. The rear wall 61 is pivotable on a horizontal pin 62 (see FIGS. 3 and 5) which is parallel to the adjacent stretches of the chains 24. The pivot pin 62 and the side walls 60, 60' are mounted on or rigid with a supporting plate 63 which is mounted on and travels with the chains 24. The pivot pin 62 supports a two-armed lever 64 one arm of which is connected with the rear wall 61 and the other arm of which carries a roller follower 65 extending into the groove 66 of a stationary cam 67 fixedly mounted in the frame 90 of the intermediate conveyor system. The configuration of the groove 66 in the cam 67 is such that the rear walls 61 of successive containers 25 are caused to pivot between substantially horizontal and substantially vertical positions during travel along predetermined portions of their path. The vertical positions of a rear wall 61 are shown in FIGS. 3, 5 and 6; the horizontal position of a rear wall 61 is illustrated in FIG. 7.

Each rear wall 61 has an upper end portion 68 (it being assumed that such wall dwells in the vertical position shown in FIG. 3, 5 or 6) which supports an adjustable holding and conditioning device 69. Each holding device 69 comprises a horizontal shaft 70 which is parallel to the respective pivot pin 62 and a three-armed lever 71 which is pivotably mounted on the shaft 70 and one arm of which is provided with a holding and conditioning element 72 consisting of sheet metal or the like. The straight front edge portion 73 of the holding element 72 is parallel to the axis of the shaft 70. A second arm of the lever 71 is normally biased in clockwise direction, as viewed in FIG. 3 or 5, by a helical spring 74 which reacts against the rear wall 61 and tends to raise the holding element 73 above and away from the bag 3 in the respective container 25. The third arm of the lever 71 carries a roller follower 75 which can engage and then moves along a fixed guide rail 76 (see FIG. 6) mounted in the frame 90 of the intermediate conveyor system. When the rear wall 61 assumes the horizontal position shown in FIG. 7, the roller follower 75 of the lever 71 in the respective holding device 69 can engage and then travels along a second stationary guide rail 77. The rail 76 can pivot the lever 71 and its holding element 72 toward the upper marginal portion 91 of a bag 3 in the respective container 25. On the other hand, the rail 77 can pivot the lever 71 in the opposite direction so that the holding element 72 becomes disengaged from the adjacent marginal portion 91 of a bag 3.

The straight front edge portion 73 of the holding element 72 can be moved toward and can cooperate with a complementary holding device or strip 78 which is provided on the upper end portion 68 of the respective rear wall 61 and is preferably of substantially L-shaped profile. The strip 78 has a front surface 79 which is parallel to the general plane of the respective rear wall 61 and is normal or substantially normal to a second surface 80 extending all the way to an edge face 81 of the strip 78. The edge face 81 is immediately or closely adjacent to the path of movement of front edge portion 73 on the corresponding holding element 72 when the respective lever 71 is pivoted by the guide rail 76 (see particularly FIG. 6).

The pivotable rear wall 61 of each container is further provided with a forwardly extending platform or ledge 82 having an upper surface 83 serving as a rest for a bag 3 whereby such bag occupies the space located at the front side of the rear wall 61 and being surrounded from three sides by the ledge 82 and the respective side walls 60, 60'. The upper surface 83 of the ledge 82 is located at a predetermined distance from the edge face 81 of the respective strip 78.

The chains 24 of the transporting unit TU may cooperate with an endless belt 85 of a conveyor which is mounted on a supporting rail 84 (see FIGS. 2, 5 and 6) in such a way that one of its stretches travels along the outer side of the rail 84 opposite the adjacent row of containers 25. The speed of the belt 85 preferably equals the speed of chains 24. The belt 85 is mounted downstream of the station which accommodates the bag removing unit 12 (see FIG. 2) and serves to prevent the bags 3 from falling out of the adjacent containers 25, i.e., a bag 3 which rests on the ledge 82 of a container 25 and tends to lean away from the respective rear wall 61 abuts against the adjacent stretch of the belt 85 which moves in the same direction and at the same speed as the container.

The loaded containers 25 transport their contents past a folding or conditioning unit 86 (see FIGS. 1 and 5). This unit comprises a bag folding tool 87 which can enter the space below the surfaces 80 on the strips 78 of successive containers 25 (this is shown in FIG. 5). The tool 87 receives motion from two crank drives 88 which enable the working end of the tool 87 to move below the surface 80 of the adjacent strip 78 and to accompany such strip during a portion of its movement with the chains 24.

The first guide rail 76 is mounted in the frame 90 downstream of the folding unit 86 (see FIG. 1) and serves to pivot successive levers 71 in a counterclockwise direction, as viewed in FIG. 6, so that the holding elements 72 engage the upper marginal portions 91 of the respective bags 3 and press them against the front surfaces 79. Each lever 71 has two stable positions and an unstable intermediate position; therefore, when a lever 71 is pivoted by the rail 76, it snaps over from the position of FIG. 5 to the position of FIG. 6 and is thereupon biased by the respective spring 74 to urge the front edge portion 73 of its holding element 72 against the upper marginal portion 91 of the bag 3 in the corresponding container 25 whereby the upper marginal portion 91 of the bag is pressed against the surface 79. This insures that the upper marginal portion 91 of the bag 3 is only held or that such portion 91 is folded and thereupon held by the respective element 92 under the action of the spring 74.

Depending on the height of the bags 3 and the selected distance between the surfaces 83 of the ledges 82 and the edge faces 81 on the strips 78 of the containers 25, the upper marginal portions 91 of the bags 3 in their containers 25 will be located below the surfaces 80 or will extend upwardly beyond the front edge faces 81. In the latter instance, the upper marginal portions 91 of successive bags 3 are folded by the tool 87 during travel past the folding unit 86 (see FIG. 5), i.e., each upper marginal portion 91 is folded to assume the shape of an L with one leg extending along the front surface 79 and the other leg extending along the second surface 80 of the respective strip 78. When the thus treated bags 3 thereupon reach the guide rail 76, the latter pivots the corresponding levers 71 in a counterclockwise direction (from the position shown in FIG. 3 to the position shown in FIG. 6) whereby the holding elements 72 move along arcuate paths having their centers of curvature on the axes of the respective pivot pins 70 so that the edge portions 73 engage the horizontal parts of upper marginal portions 91 from above and complete the folding of marginal portions 91 in a manner as shown in FIG. 6. Thus, the upper marginal portion 91 of each bag 3 is folded over itself with attendant reductin of the overall height of the bag to equal the distance between the upper surface 83 of the ledge 82 and the surface 80 of the corresponding strip 78. At the same time, the front edge portions 73 hold the adjacent folded-over upper marginal portions 91 of bags 3 against opening up by pressing the folded marginal portions against the respective front surfaces 79. If the height of bags 3 is such that they extend to but not beyond the respective second surfaces 80, the front edge portions 73 of associated holding elements 72 merely serve to hold the upper marginal portions 91 of bags by clamping them against the respective front surfaces 79.

The chains 24 thereupon transport the containers 25 along the stationary guide rail 77. During this stage of movement of the containers 25, the roller followers 65 travel in a portion of the cam groove 66 (see FIG. 7) which causes the rear walls 61 to move from vertical positions (FIG. 3) to horizontal positions whereby the respective roller followers 75 travel along the guide rail 77 amd move the front edge portions 73 away from the folded-over marginal portions 91. This takes place while the containers 25 register with and overlap horizontal receptacles or troughs 92 on the chains 95 of a conveyor in the cartoning machine 100 so that the freshly released bags 3 come to rest on the bottom walls of the receptacles 92 by gravity. The containers 25 may share the movements of adjoining receptacles 92 along a relatively short stretch and are thereupon caused by the cam 67 to return their rear walls 61 to the upright positions shown in FIGS. 1, 2, 3 and 5. The cartoning machine 100 may be identical with or similar to the machine which is disclosed in the U.S. Pat. No. 3,333,396 to Paal et al. This cartoning machine may operate continuously and its purpose is to introduce each bag 3 into a discrete carton or to introduce into each carton a stack of two or more bags. The path along which the receptacles 92 are moved by the chains 95 is parallel to the path 9 or 10.

Figure 8:
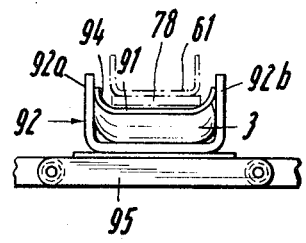
FIG. 8 is an end elevational view of a detail as seen in the direction of arrow VIII in FIG. 7.

FIGS. 7 and 8 show that the pivotable rear wall 61 of a container 25 can enter the adjacent receptacle 92 of the cartoning machine 100. If the width of a bag 3 exceeds the width of the respective rear wall 61, the lateral marginal portions 94 of the bag 3 (such lateral marginal portions 94 are vertical when a bag dwells in the position shown in FIG. 5) are folded along the upstanding walls or cheeks 92a, 92b of the respective receptacle 92 to thereby further reduce the overall size of the bag 3, i.e., such bag can be stored in a relatively small (narrow) carton.

The conveyor which includes the chains 95 and receptacles 92 can form part of the intermediate conveyor system. The latter then further comprises suitable transfer means (e.g., pneumatically or mechanically reciprocable pusher means) for transferring bags 3 from successive receptacles 92 into successive cartons, boxes or the like on a conveyor of the machine 100.

Without further analysis, the foregoing will so fully reveal the gist of the present invention that others can, by applying current knowledge, readily adapt it for various applications without omitting features which fairly constitute essential characteristics of the generic and specific aspects of our ccontribution to the art and, therefore, such adaptations should and are intended to be comprehended within the meaning and range of equivalence of the claims.

What is claimed as new and desired to be protected by Letters Patent is set forth in the appended

1. In a production line, a combination comprising a first conveyor arranged to transport at least one row of bags or analogous commodities along at least one first path; a second conveyor spaced apart from said first conveyor and having a series of receptacles each arranged to receive at least one commodity; and an intermediate conveyor system disposed between said first and second conveyors and including a receiving unit having retaining means for accepting commodities from said first conveyor and transmission means for changing the orientation of the thus loaded retaining means through an angle exceeding 90 degrees, and a transporting unit having a plurality of containers arranged to travel along a further path extending from said receiving unit to said second conveyor, said containers being arranged to accept commodities from loaded retaining means subsequent to said change in orientation of said retaining means and to transport the thus accepted commodities toward said receptacles.

2. A combination as defined in claim 1, wherein said first conveyor comprises a plurality of clamping means for said commodities and means for moving said clamping means in stepwise fashion, said second conveyor comprising means for continuously moving said receptacles at a predetermined speed.

3. A combination as defined in claim 1, wherein said first conveyor is arranged to transport several parallel rows of commodities along several discrete first paths, said retaining means comprising at least one discrete retaining element for each of said rows and said transmission means including a discrete transmission for each of said retaining elements, each of said retaining elements being arranged to accept commodities from the respective first path.

4. A combination as defined in claim 3, wherein said receiving unit further comprises a continuously driven turntable for each of said retaining elements and each of said discrete transmissions comprises means for pivoting said retaining elements relative to said turntables during predetermined stages of each revolution of said turntables.

5. A combination as defined in claim 4, wherein said means for pivoting said retaining elements comprises cam means arranged to move the respective retaining elements substantially at right angles to the respective first paths immediately prior and immediately after acceptance of commodities by said retaining elements and to move the respective retaining elements along arcuate paths during acceptance of commodities by said containers, said further path being at least substantially tangential to said arcuate paths.

6. A combination as defined in claim 1, wherein each of said containers comprises a portion which is movable between a first position in which it accepts a commodity from said retaining means and a second position in which it transfers a commodity to one of said receptacles, said intermediate conveyor system further comprising means for moving said portions of successive containers between said first and second positions in predetermined portions of said further path.

7. A combination as defined in claim 6, wherein each of said container portions is pivotable between said first and second positions, said means for moving said container portions comprising stationary cam means adjacent to said further path and follower means provided on said container portions and arranged to track said cam means.

8. A combination as defined in claim 6, wherein each of said container portions is provided with movable holding means, said intermediate conveyor system further comprising means for engaging said holding means with the commodities on the respective container portions in the first position of said container portions and for disengaging said holding means from the commodities in the respective container portions in the second positions of said container portions.

9. A combination as defined in claim 8, wherein said holding means comprises spring-biased holding elements pivotably mounted on the respective container portions.

10. A combination as defined in claim 1, further comprising conditioning means arranged to fold selected portions of commodities in said containers, said conditioning means comprising folding means adjacent to said further path and actuatable to effect at least partial folding of said selected portions of commodities in successive containers.

11. A combination as defined in claim 10, wherein said conditioning means further comprises second folding means provided on each of said containers and actuatable to complete the folding of said selected portions of commodities in the respective containers.

12. A combination as defined in claim 11, wherein each of said second folding means comprises a holding element movably mounted on the respective container and means for moving said holding elements relative to the respective containers during travel of said containers along predetermined portions of said further path.

13. A combination as defined in claim 1, wherein said containers are arranged to deliver commodities into said receptacles, said containers and said receptacles comprising portions which cooperate during delivery of commodities into the receptacles to reduce the dimensions of commodities.

14. A combination as defined in claim 13, wherein said portions of said containers include movable walls which are insertable into said receptacles, said portions of said receptacles including additional walls spaced apart by a distance less than the corresponding dimension of a commodity in a receptacle whereby said walls cooperate to deform the commodities during introduction into said receptacles.

15. A combination as defined in claim 1, wherein said retaining means comprises at least one pair of relatively movable suction heads.

16. A combination as defined in claim 1, wherein said second conveyor defines for said receptacles an additional path which is parallel to said first and further paths.

17. A combination as defined in claim 1, wherein each of said containers comprises a pair of side walls which are located in planes normal to said further path and a third wall movable relative to said side walls between an upright position and an inclined position, said third wall having platform means for supporting commodities which are delivered by said retaining means in the upright position of the respective third wall and for allowing gravitational descent of a commodity in the inclined position of the respective third wall.

18. A combination as defined in claim 1, wherein said first conveyor forms part of a bagging machine and said second conveyor forms part of a cartoning machine.

19. A combination as defined in claim 1, wherein said receptacles are substantially horizontal troughs and said transporting unit comprises means for moving successive loaded containers into positions of overlap with successive empty receptacles.

20. A combination as defined in claim 1, wherein said commodities are filled and closed bags each having a plurality of mutually inclined marginal portions, said intermediate conveyor system comprising means for folding at least one marginal portion of each closed bag not later than on entry of bags into said receptacles.

21. A combination as defined in claim 20, wherein the bags moving along said first path and along portions of said further path are located in vertical planes and the bags are located in horizontal planes not later than on transfer onto said second conveyor.

22. A combination as defined in claim 1, wherein said first path is spaced apart from and parallel with said further path, said receiving unit being disposed between said first path and said further path.

23. A combination as defined in claim 22, wherein said transmission means is arranged to turn said retaining means through about 180 degrees during transfer of commodities from said first path into said further path.

* * * * *